United States Patent
Liu et al.

(10) Patent No.: US 7,779,432 B2
(45) Date of Patent: Aug. 17, 2010

(54) AUTOMATIC DISK FEEDING DEVICE FOR DISK DUPLICATION SYSTEM AND METHOD THEREOF

(75) Inventors: Ming-Hsun Liu, Taipei (TW); Chung-Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 154 days.

(21) Appl. No.: 12/181,767

(22) Filed: Jul. 29, 2008

(65) Prior Publication Data

US 2010/0031280 A1 Feb. 4, 2010

(51) Int. Cl.
*G11B 17/04* (2006.01)

(52) U.S. Cl. .................................. 720/623

(58) Field of Classification Search ............... 720/623, 720/619, 621, 622, 601, 626; 369/30.33–30.35, 369/30.85
See application file for complete search history.

(56) References Cited

U.S. PATENT DOCUMENTS

| | | | | |
|---|---|---|---|---|
| 5,036,503 A * | 7/1991 | Tomita | ............... | 369/30.43 |
| 5,914,918 A * | 6/1999 | Lee et al. | ............... | 369/30.32 |
| 6,141,298 A * | 10/2000 | Miller | ............... | 369/30.33 |
| 6,337,842 B1 * | 1/2002 | Wolfer et al. | ............... | 369/30.57 |
| 6,490,232 B2 * | 12/2002 | Sato | ............... | 369/30.34 |
| 6,760,052 B2 * | 7/2004 | Cummins et al. | ............... | 347/171 |
| 6,990,674 B1 * | 1/2006 | Cummins et al. | ............... | 720/623 |
| 7,254,818 B2 * | 8/2007 | Hagstrom | ............... | 720/601 |
| 7,505,377 B1 * | 3/2009 | Peterson et al. | ............... | 369/30.34 |
| 7,509,660 B2 * | 3/2009 | Liu et al. | ............... | 720/615 |
| 2005/0007896 A1 * | 1/2005 | Haas | ............... | 369/30.6 |
| 2008/0123477 A1 * | 5/2008 | Liu et al. | ............... | 369/30.33 |
| 2008/0288969 A1 * | 11/2008 | Waiman | ............... | 720/615 |
| 2009/0178066 A1 * | 7/2009 | Liu et al. | ............... | 720/615 |

* cited by examiner

*Primary Examiner*—Tan X Dinh
(74) *Attorney, Agent, or Firm*—Banger Shia

(57) ABSTRACT

An automatic disk feeding device for disk duplication system and method thereof which comprises two transport assemblies disposed at both sides of a disc holder. Each transport assembly comprises a linkage disk which drives a connecting rod to rotate, and then the connecting rod moves a sliding block which cooperates with a push member and a slide rail to slide. The sliding block is defined with slant pushing grooves, and the slide rail is defined with L-shaped tracks. The push member is provided with pushing protrusions and guiding protrusions inserted in the pushing grooves and the L-shaped tracks. Thereby, the push members can clamp the disc by a horizontal extending method firstly, and then lift the disc, thus automatically taking out the disc in a small space.

7 Claims, 10 Drawing Sheets

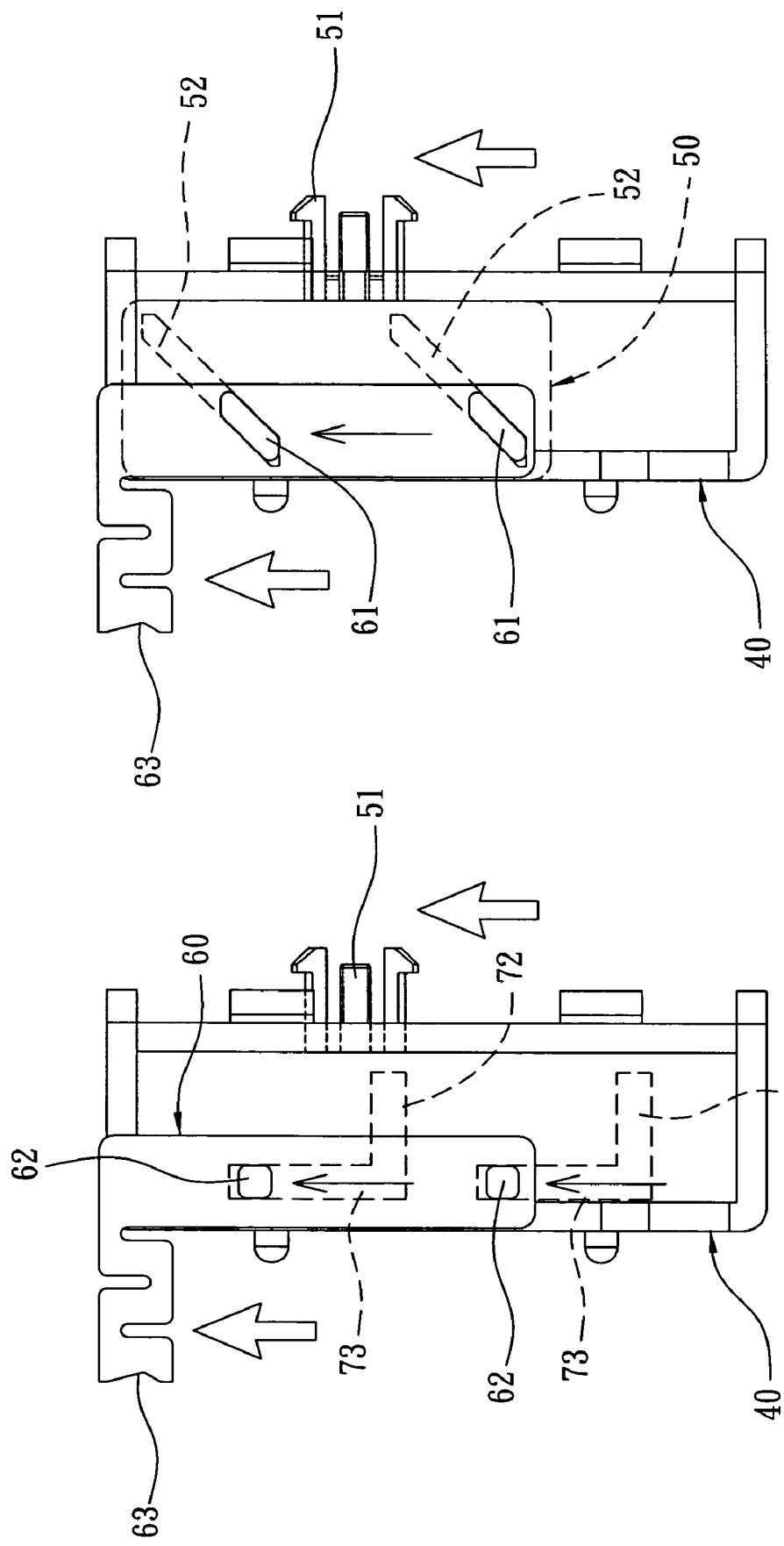

AUTOMATIC DISK FEEDING DEVICE FOR DISK DUPLICATION SYSTEM AND METHOD THEREOF

BACKGROUND OF THE INVENTION

1. Field of the Invention

The present invention relates to an automatic disk feeding device for disk duplication system and method thereof which can feed the disc automatically during the copy process and can take out the disc automatically after completion of copy.

2. Description of the Prior Art

Using optical medium to store data has the advantages of small size and large capacity, in order to meet the current requirements of high definition and high quality audio, the optical disk has become an indispensable medium for today's life. Nowadays, the disk is usually used to record, duplicate or save various signal data, including video, music, computer software, and etc.

Normally, mass produced optical disks must be subjected to a process of mass disk pressing, and the least required production quantity is at least numbered by thousands. However, although such a disk pressing method can perform mass production, the recording, duplicating or saving process still needs to be done disk by disk, and the disk-by-disk process is also the problem disturbing the production mostly. For economic reasons, nowadays, manufacturers have adopted automatic disk burning/recording, feeding, ejecting, changing and packaging devices; hence, automatic production machines have been the mainstream of equipments in the current market.

The current automatic production machines are described as follows:

For example, a disk duplication device disclosed in U.S. Pat. No. 6,141,298 is provided with several burning devices which are superpositioned and stacked in the same disk burning equipment, and is further provided with a mechanical pick-up device which is rotatable and movable up and down for automatically picking up the master disk, blank disk and burned disk. However, this conventional equipment has a very complicated structure and is very high in production and operation costs. Further, in order to achieve automation but without considering the waste of space, the whole structure of this conventional equipment occupies a huge amount of space. Besides the inconveniences of package, transport and logistic, it will occupy too much space of the manufacturer's factory.

Another example is a disk feeding device disclosed in U.S. Pat. No. 6,490,232, which utilizes a transfer device to drive an arm to rotate and move up and down for facilitating delivery and pickup of blank disk from those stacked in the disc holder, then puts the blank disk into the disc-carrying member of the printer, and finally picks up the printed disk from the disc-carrying member of the printer and puts it into another holder where the disks are stacked. This disk feeding device is also complicated in structure and occupies a lot of space.

Especially, the activity of this conventional disk feeding device taking out one disk from the stacked disks step by step must relies on a complicated pick-up device to rotate and move the arm up and down. The whole operating structure is quite complicated, and the operation of the pick-up device and the arm also requires a quite amount of space. Hence, the abovementioned conventional devices need to be further improved.

To have a simplified structure and a reduced installed space, the inventor of this application has particularly invented an automatic disk feeding and duplication device as disclosed in U.S. patent application Ser. No. 11/669,931, with reference to FIGS. 1 and 2, which comprises: a frame 10, a disk holder 11, a transport assembly 12 and a copy unit 13. The copy unit is disposed in the frame, and the disk holder is mounted on the frame corresponding to the copy unit. The frame is provided with a set of movable push members located corresponding to the disc tray of the copy unit. Each push member has an outward restoring force and is caused to move up and down by sway of the transport assembly, thus achieving the effect of feeding disks one by one to the copy unit. The disks after burning can be taken out by the push members cooperating with the transport assembly. Finally, the push members are restored outward to release the disk onto a disk-ejecting member, thus finishing the disk duplication in a quick and continuous manner. Advantageous as it is, the previous invention of the inventor of this invention still has some disadvantages that need to be improved.

The present invention has arisen to mitigate and/or obviate the afore-described disadvantages.

SUMMARY OF THE INVENTION

The technical problems that need to be solved:

The conventional automatic disk feeding and duplication device is complicated in structure which causes it inconvenient to design, manufacture and assemble, and produces a great motion and occupies a huge amount of space.

Technical characteristics for solving the conventional problems:

The present invention provides an automatic disk feeding device for disk duplication system and method thereof which mainly utilizes two transport assemblies disposed at both sides of a disc holder to achieve the effects of the present invention. The transport assemblies move along with a linkage rod, and a power source drives the transport assemblies to move. Each transport assembly comprises a linkage disk, a connecting rod, a positioning cover, a sliding block, two push members and two slide rails. The linkage disk drives the connecting rod to rotate in a fixed direction, and then the connecting rod moves the sliding block and make it slide in the positioning cover. The ejecting process is a reciprocating movement. The positioning cover is defined with a guide hole for restricting the sliding block, the push members and the slide rails. The sliding block is defined with slant pushing grooves at both sides thereof. The push members are located at both sides of the sliding block. An inner surface of each push member is provided with pushing protrusions, and an outer surface of each push member is provided with guiding protrusions. One end of each push member is provided with a clamping member. The slide rails are disposed at the outer surfaces of the push members. An inner surface of each slide rail is defined with L-shaped tracks. The pushing protrusions are inserted in the pushing grooves of the sliding block, so as to allow the push members to perform a telescopic movement. The guiding protrusions are inserted in the L-shaped tracks, so as to allow the push members to perform telescopic, and ascending and descending movements.

The present invention has the following advantages compared with the prior art:

Firstly, the primary objective of the present invention is to provide an automatic disk feeding device for disk duplication system and method thereof, the linkage disk, the connecting rod, the positioning cover, the sliding block, the push members and the slide rails of each transport assembly are small in size and produce a small motion. The transport assembly only occupies a small space in a periphery of a tray, and moves a small distance at an upper portion of the tray, so that it can cooperate with the duplication device by using the smallest size and space.

Secondly, the second objective of the present invention is to provide an automatic disk feeding device for disk duplication system and method thereof, with the L-shaped tracks defined in the slide rails and with the cooperation of the sliding blocks, the clamping members of the push members can clamp the disc by a horizontal extending method firstly, and then stably move the disc by a vertical or inclined ascending method, and finally release and eject the disc automatically. Hence, the present invention not only can stabilize the operation and eject the disc quickly, but also satisfies the requirement of automatic disk ejection.

Thirdly, the third objective of the present invention is to provide an automatic disk feeding device for disk duplication system and method thereof, the linkage disk, the connecting rod, the positioning cover, the sliding block, the push members and the slide rails of each transport assembly all can be made by the plastic injection molding method, such that the purpose of mass production is achieved and the cost is reduced.

Fourthly, the fourth objective of the present invention is to provide an automatic disk feeding device for disk duplication system and method thereof, the ends of the clamping members of the push members are designed to be V-shaped for automatically guiding the disk to the center, thus stably clamping the disc, and further improving the stability of disk clamping operation.

Fifthly, the fifth objective of the present invention is to provide an automatic disk feeding device for disk duplication system and method thereof, under the condition that the structure is not changed, the transport assemblies can also clamp and release the disc when being designed to be inclined, such an inclined design enables the disc to eject out in the inclined direction, so as to avoid the duplication device and to prevent the disc from unanticipatedly falling, thus releasing the disc successfully.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 7 is a side view of the transport assembly in accordance with the present invention, wherein the guiding protrusion is inserted in the L-shaped track and the clamping member is upwardly pushed;

FIG. 8 is a side view of the transport assembly in accordance with the present invention, wherein the pushing protrusion is inserted in the pushing groove and the clamping member is upwardly pushed;

DETAILED DESCRIPTION OF THE PREFERRED EMBODIMENTS

Figure 1:
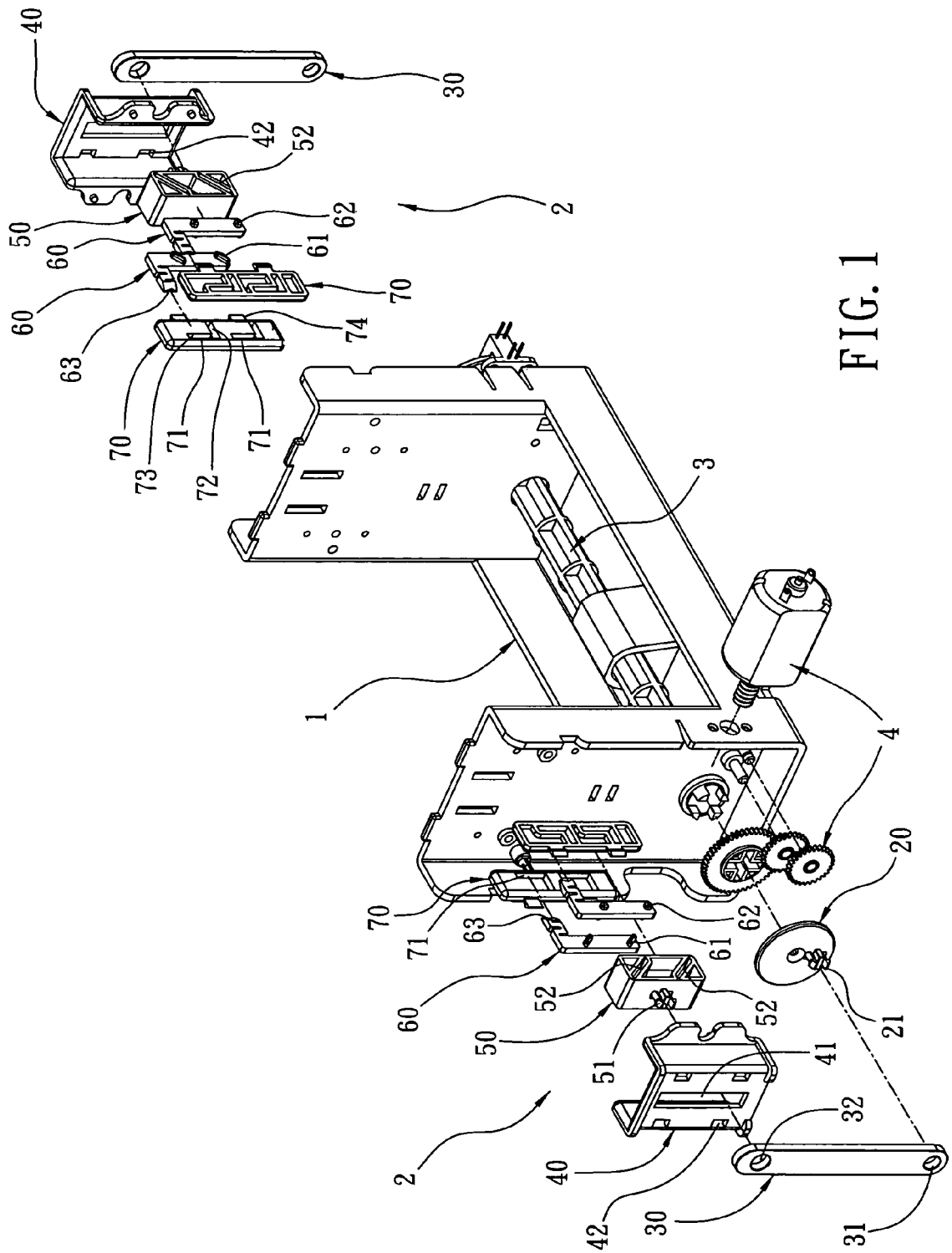
FIG. 1 is a perspective view of an automatic disk feeding device for disk duplication system in accordance with the present invention.
Figure 2:
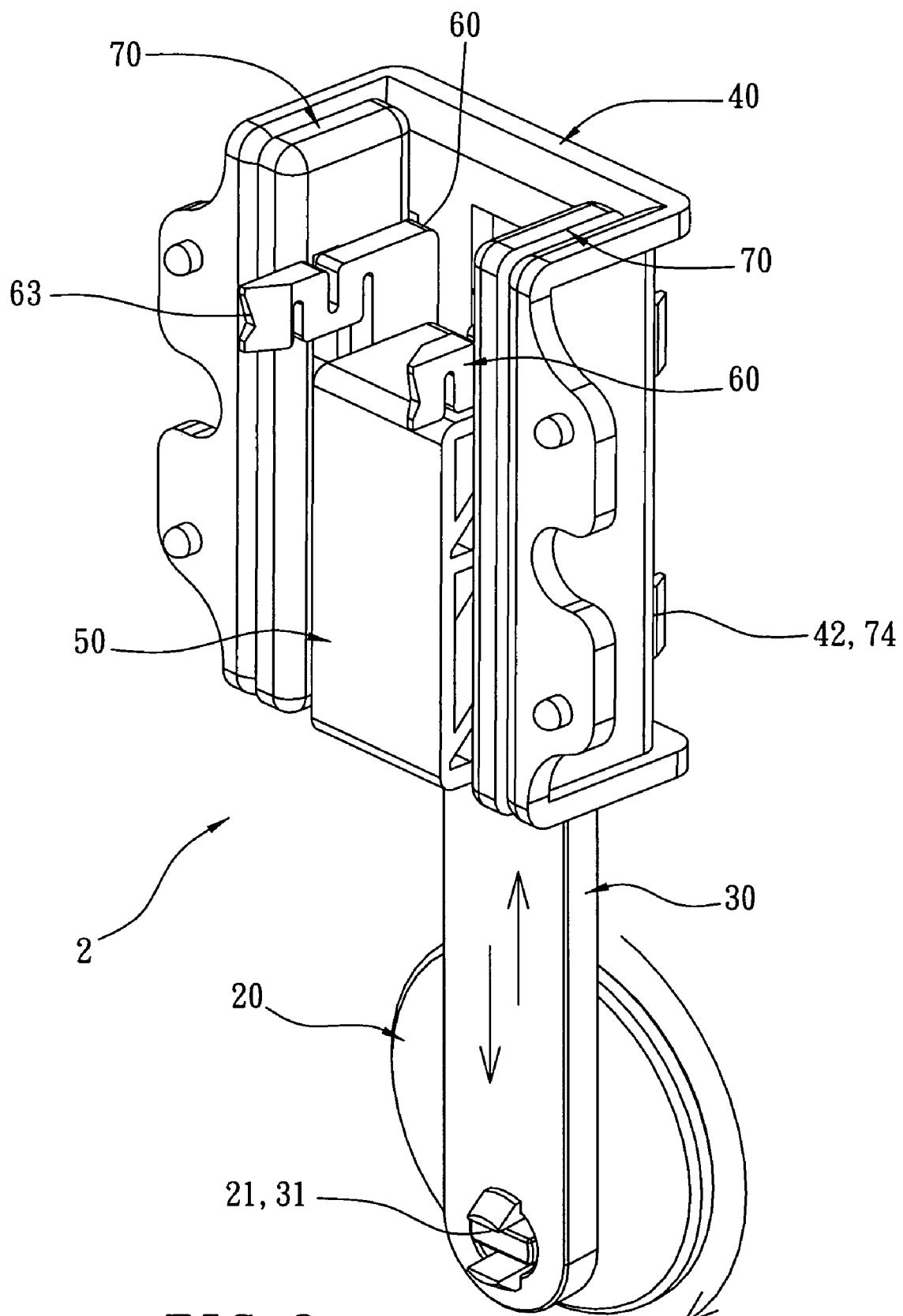
FIG. 2 is an assembly perspective view of a transport assembly of the automatic disk feeding device for disk duplication system in accordance with the present invention.

Referring to FIGS. 1 and 2, an automatic disk feeding device for disk duplication system in accordance with the present invention comprises a disk holder 1, two transport assemblies 2, a linkage rod 3 and a power source 4.

The transport assemblies 2 are disposed at both sides of the disk holder 1.

The linkage rod 3 is disposed between the transport assemblies 2 for providing the synchronous movement of the transport assemblies 2.

The power source 4 is used to provide the operation power to the transport assemblies 2.

Each transport assembly 2 comprises a linkage disk 20, a connecting rod 30, a positioning cover 40, a sliding block 50, two push members 60 and two slide rails 70.

The linkage disk 20 is eccentrically provided with a first pivot portion 21 and is connected to the linkage rod 3.

Both ends of the connecting rod 30 are provided with a first pivot portion 31 and a second pivot portion 32, respectively. The first pivot portion 31 is combined with the first pivot portion 21 of the linkage disk 20. The positioning cover 40 is vertically defined with a guide hole 41 and is disposed on the disk holder 1 for restricting the sliding block 50, the push members 60 and the slide rails 70. In addition, in both sides of an outer surface of the positioning cover 40 is defined a plurality of positioning grooves 42.

Each sliding block 50 is provided with a second pivot portion 51 at an outer surface thereof and is defined with at least one slant pushing groove 52 at both sides thereof, and the slant pushing grooves 52 are obliquely lowered from outside toward inside thereof. The sliding block 50 is disposed in the positioning cover 40, and the second pivot portion 51 is inserted in the guide hole 41 and is pivotally disposed in the second pivot portion 32 of the connecting rod 30.

The push members 60 are Γ-shaped, an inner surface of each push member 60 is provided with at least one pushing protrusion 61, and an outer surface of each push member 60 is provided with at least one guiding protrusion 62. One end of each push member 60 is provided with a V-shaped clamping member 63 in the form of a notch. The push members 60 are located at both sides of the sliding block 50 which is disposed in the positioning cover 40. The pushing protrusion 61 is inserted in the pushing groove 52 of the sliding block 50, and the clamping members 63 of each transport assembly 2 are extended into the disc holder 1.

The slide rails 70 are disposed at the outer surfaces of the push members 60 inside the positioning cover 40 and are fixed to the positioning cover 40. An inner surface of each slide rail 70 is defined with at least one L-shaped track 71 having a horizontal section 72 toward outside thereof. A vertical section 73 is upwardly extended from an inner side of the horizontal section 72. The L-shaped tracks 71 are provided for insertion of the guiding protrusions 62 of the push members 60. One lateral side of each slide rail 70 where the horizontal section 72 extends is provided with a plurality of positioning pieces 74 for restricting the positioning grooves 42 of the positioning cover 40.

Figure 4:
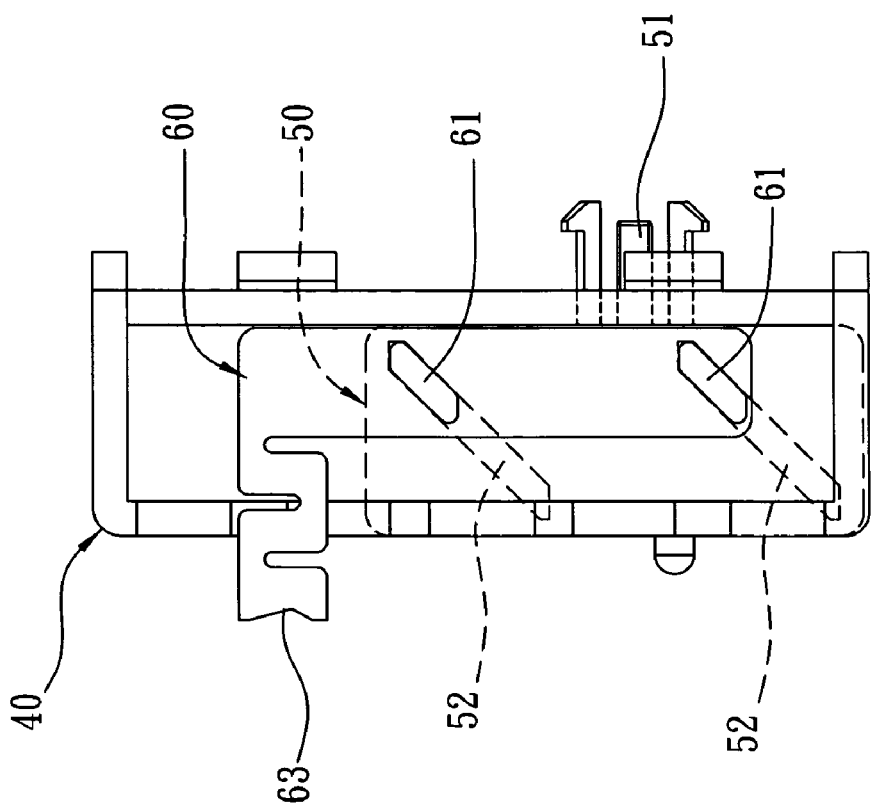
FIG. 4 is a side view of the transport assembly in accordance with the present invention, wherein a pushing protrusion is inserted in a pushing groove and the clamping member is not extended out of the positioning cover.
Figure 3:
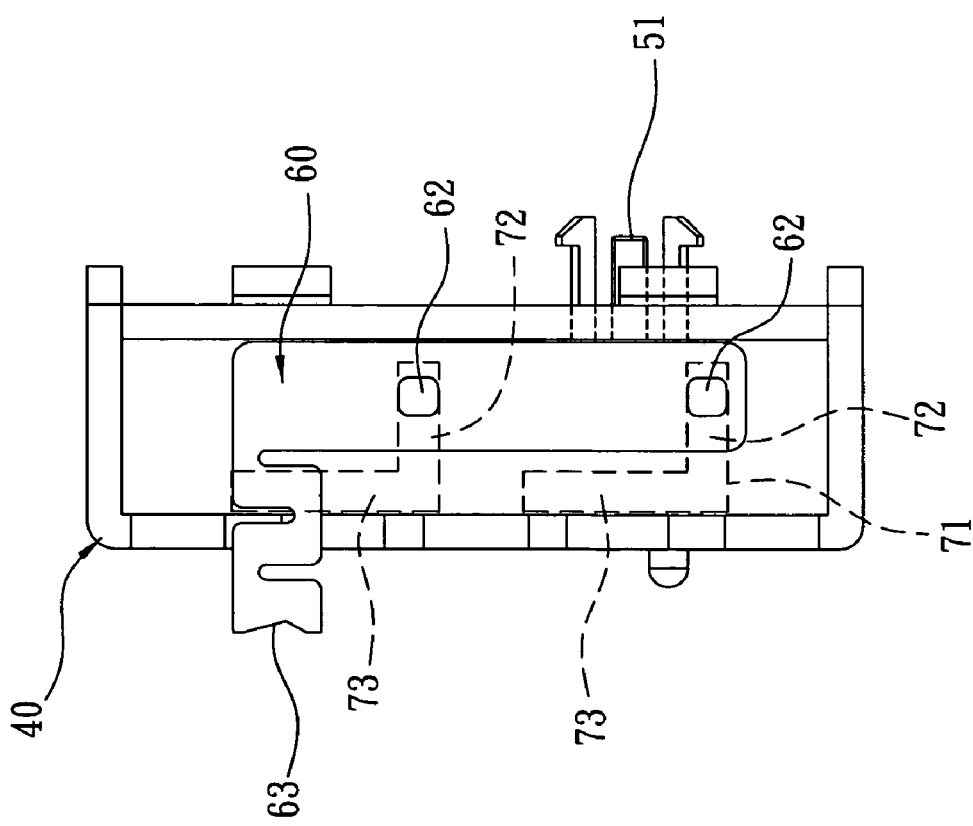
FIG. 3 is a side view of the transport assembly in accordance with the present invention, wherein a guiding protrusion is inserted in a L-shaped track and a clamping member is not extended out of a positioning cover.
Figure 6:
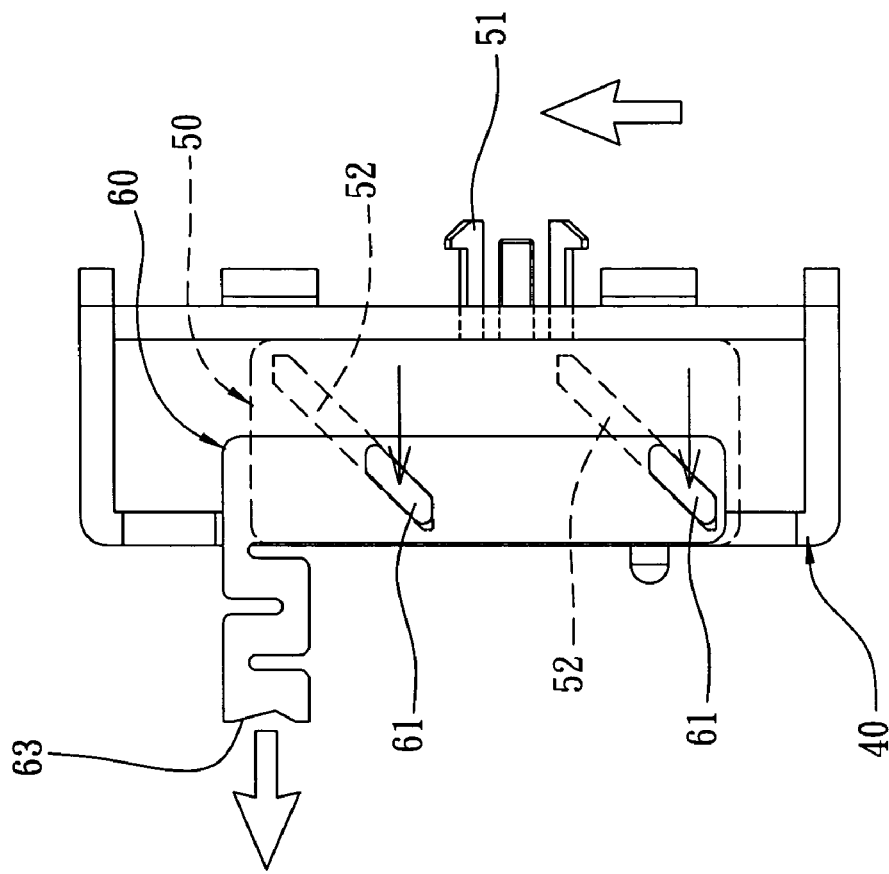
FIG. 6 is a side view of the transport assembly in accordance with the present invention, wherein the pushing protrusion is inserted in the pushing groove and the clamping member is extended out of the positioning cover.
Figure 5:
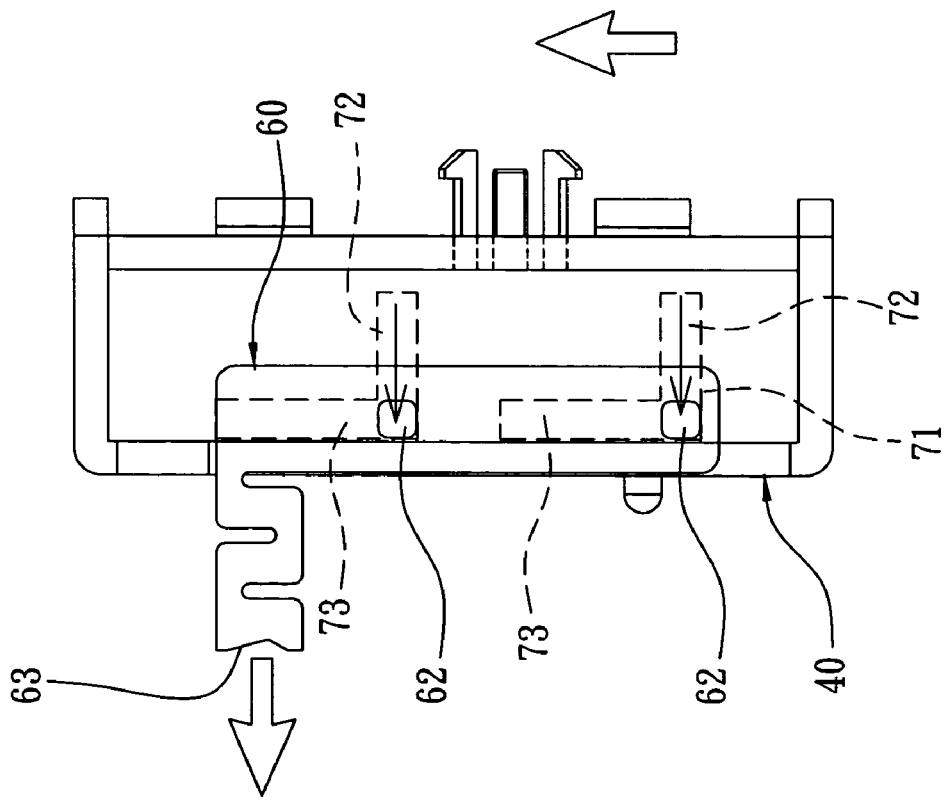
FIG. 5 is a side view of the transport assembly in accordance with the present invention, wherein the guiding protrusion is inserted in the L-shaped track and the clamping member is extended out of the positioning cover.

Referring to FIGS. 3 and 4, the pushing protrusions 61 of the push members 60 are located at upper inclined portions of the pushing grooves 52, and the guiding protrusions 62 of the push members 60 are located at outer sides of the horizontal sections 72 of the L-shaped tracks 71. The power source 4 drives the linkage rod 3 to move, and then the linkage rod 3 moves the transport assemblies 2 disposed at both sides of the disk holder 1. The linkage disks 20 of the transport assemblies 2 rotate first and move the connecting rods 30, and then the connecting rods 30 drive the sliding blocks 50 to move in the guide holes 41 of the positioning covers 40. When the connecting rods 30 push the sliding blocks 50 to move up to a certain position, the push members 60 will be pushed along the pushing grooves 52 of the sliding blocks 50 since the pushing protrusions 61 are inserted in the pushing grooves 52 as shown in FIGS. 5 and 6. Since the guiding protrusions 62 of the push members 60 are restricted by the horizontal sections 72 of the L-shaped tracks 71, the push members 60 will be pushed along the horizontal sections 72, and the clamping members 63 of the push members 60 will be extended out of the positioning covers 40. When the connecting rods 30 push the sliding blocks 50 to move up to a further position as shown in FIGS. 7 and 8, the pushing protrusions 61 move to the ends of the pushing grooves 52, and the guiding protrusions 62 move to the ends of the horizontal sections 72 of the L-shaped tracks 71 and enter the vertical sections 73 in such a manner that the push force of the connecting rods 30 is transferred to the vertical sections 73, such that the push members 60 can only be pushed upwardly. At this time, the linkage disks 20 finish half rotation. When the linkage disks 20 finish another half rotation, the push members 60 will be pushed to return to their original positions.

Figure 9:
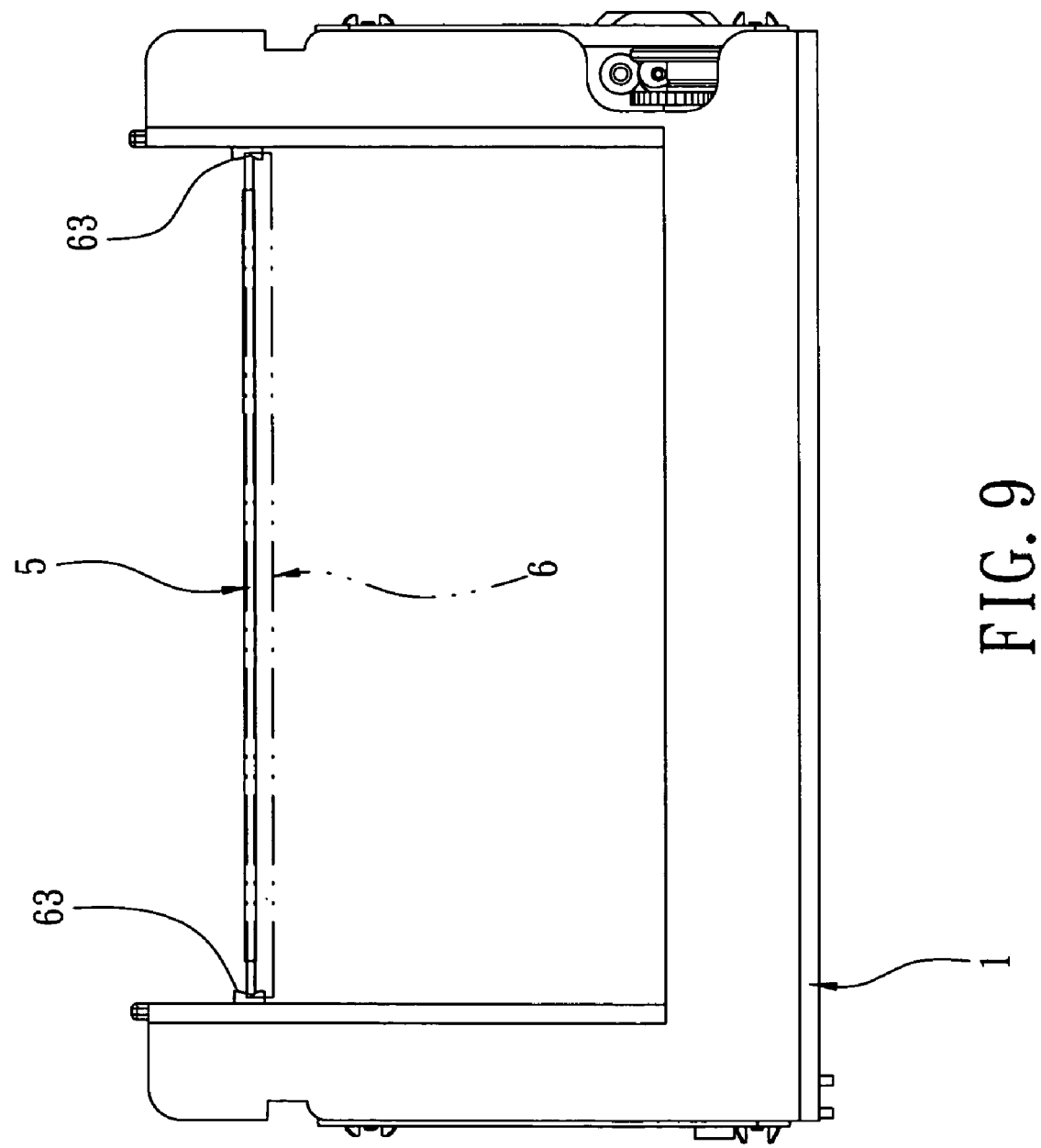
FIG. 9 is an illustrative view showing the preparation status of clamping a disc.
Figure 10:
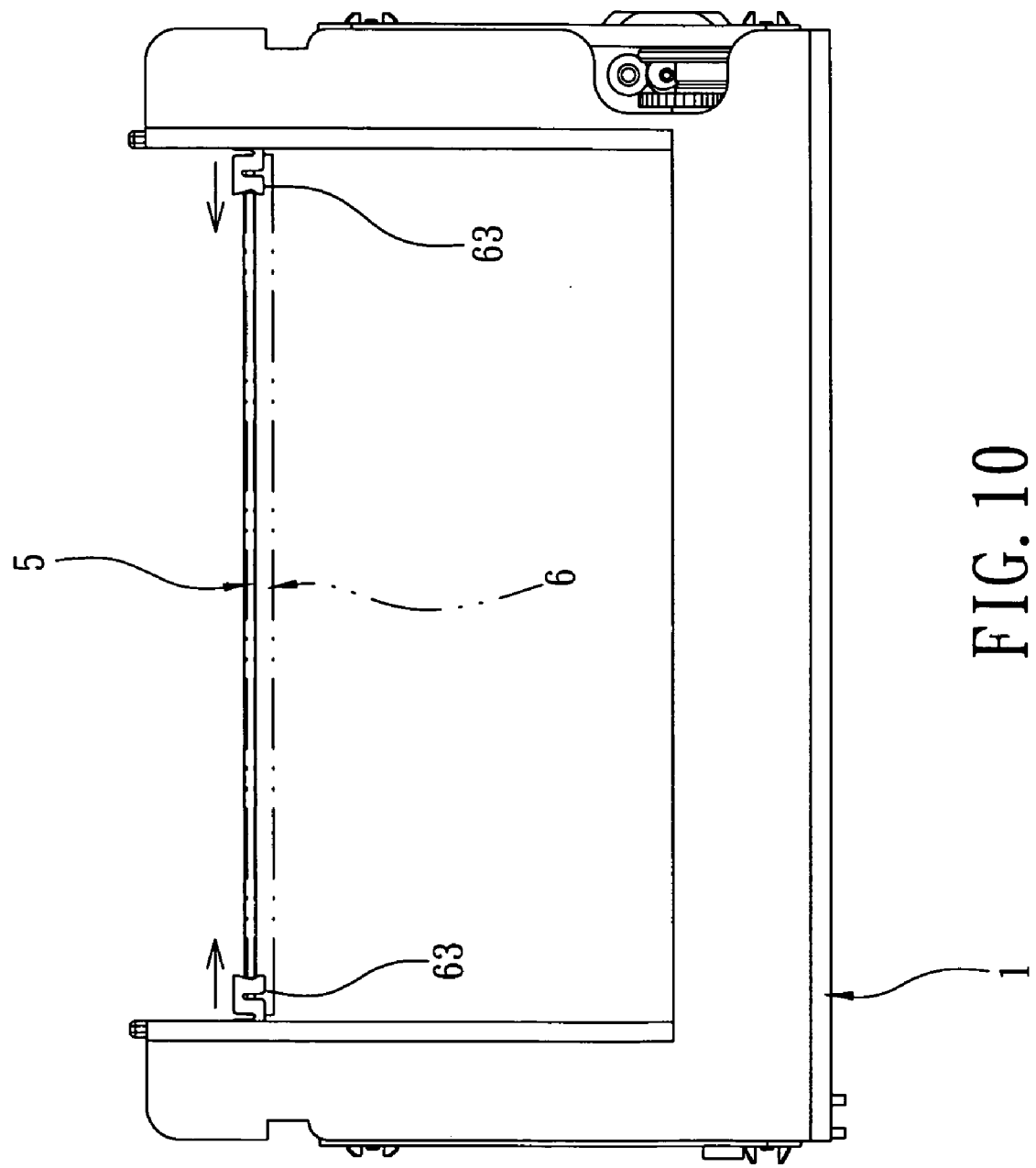
FIG. 10 is an illustrative view showing the status of clamping the disk by the clamping members.
Figure 11:
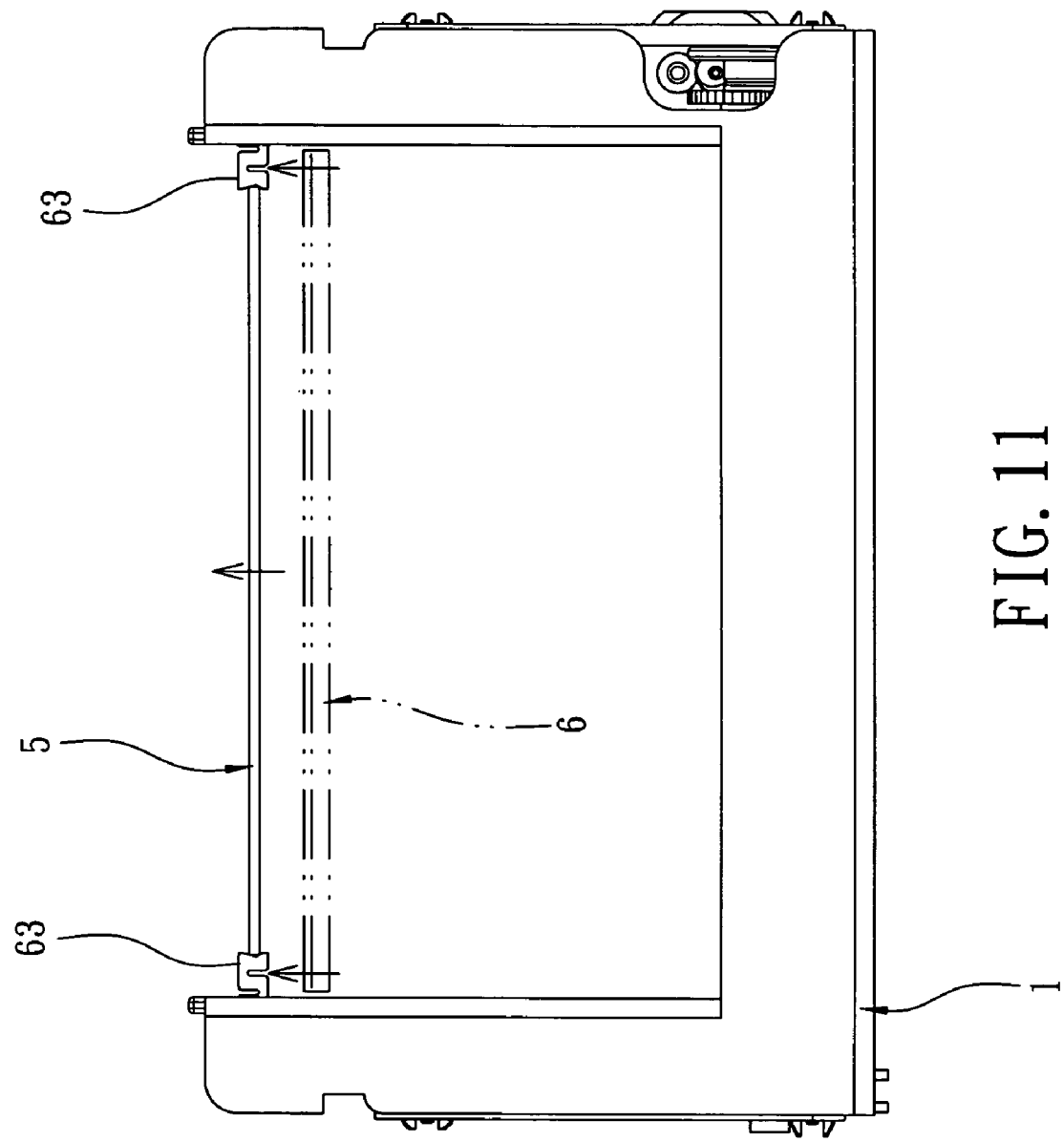
FIG. 11 is an illustrative view showing the status of clamping and upwardly pushing the disc.
Figure 12:
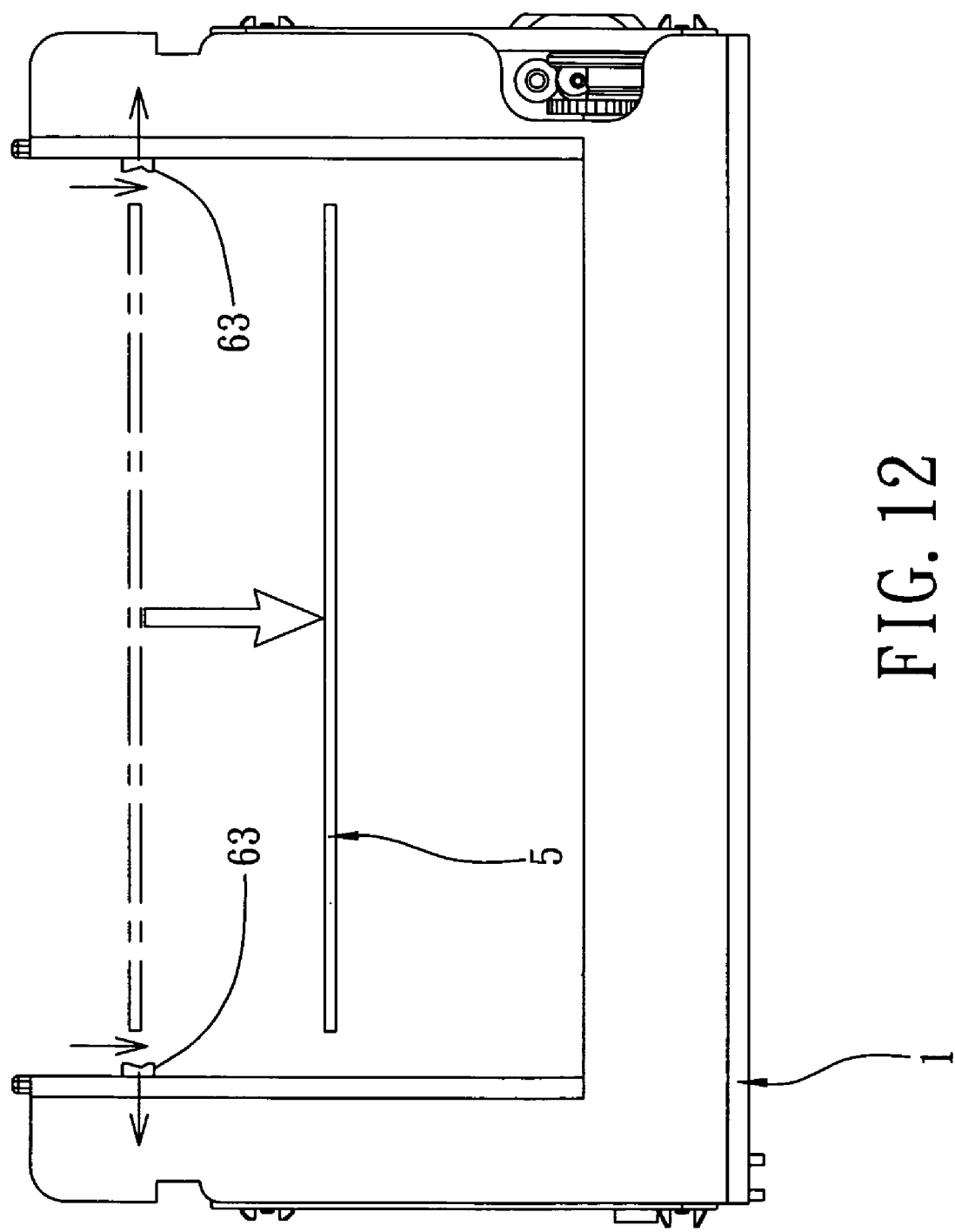
FIG. 12 is an illustrative view showing the reposition of the clamping members to make the disc fall.
Figure 13:
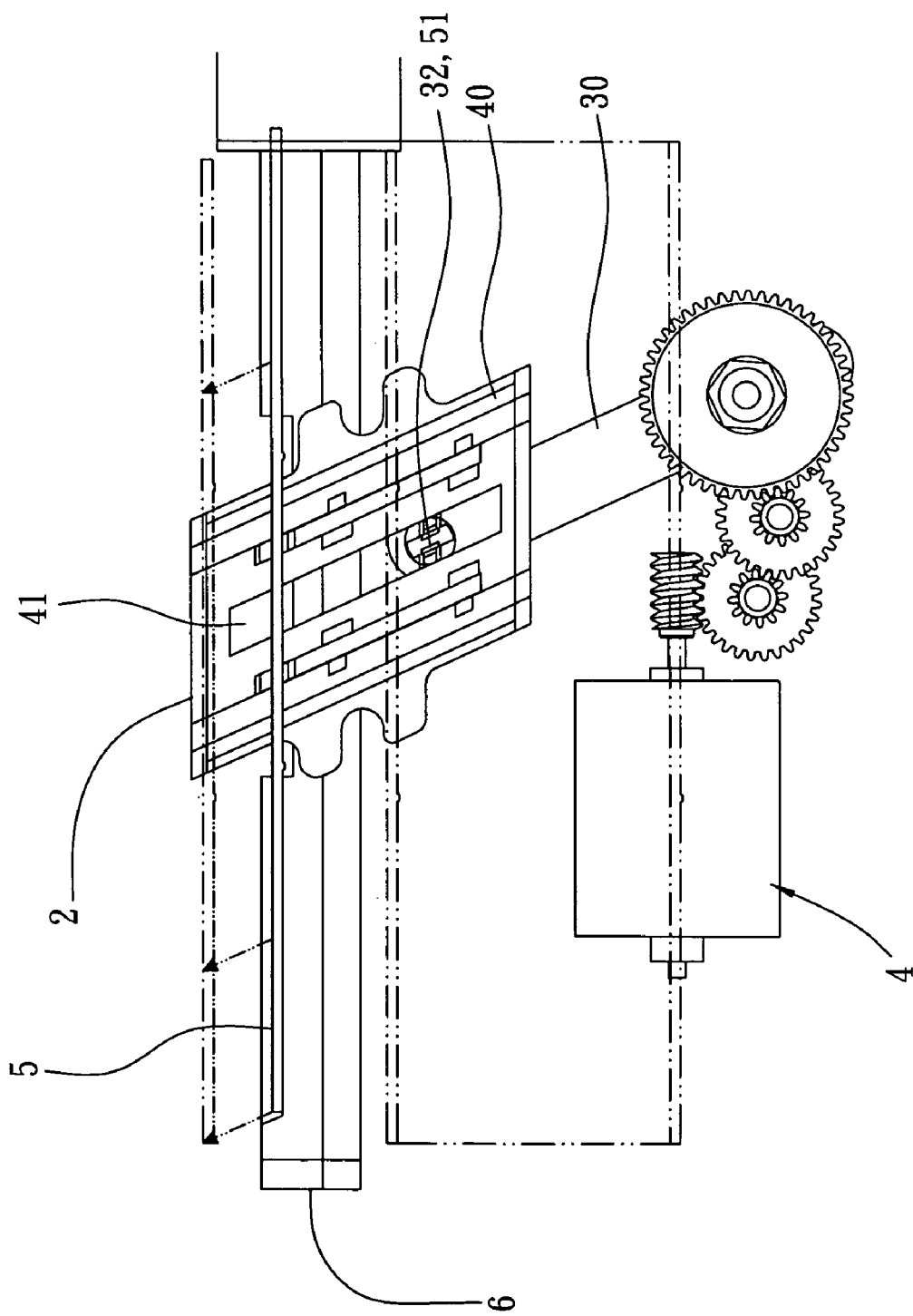
FIG. 13 is an illustrative view showing the transport assemblies designed to be inclined.

The status of feeding and taking out the disc is described as follows: referring to FIGS. 3, 4 and 9, after the disc 5 is ejected out by a tray 6 after completion of copy, the disc 5 is just located between the transport assemblies 2 inside the disc holder 1 and is located correspondingly to the clamping members 63. Then, referring to FIGS. 5, 6 and 10, the push members 60 move and the clamping members 63 extend out to clamp the disc 5. After clamping the disc 5, the opposite clamping members 63 will lift up the disc 5 to make it away from the tray 6 as shown in FIGS. 7, 8 and 11, at this time, the tray 6 will withdraw, such that a lower part of the disc 5 has no support. Then, referring to FIG. 12, the clamping members 63 of the transport assemblies 2 reversely repeat the abovementioned operations, such that the disk 5 is released from the clamping members 63 and falls, and finally the clamping members 63 withdraw, and the disc 5 is supported and transported by a transport mechanism, The transport assemblies 2 as shown in FIGS. 1-8 are vertical, such a vertical design is applicable to the tray 6 which is completely extended out to eject the disc 5 out totally, and is inapplicable to the condition that a small part of the disc 5 is located inside the duplication device when a majority part of the tray 6 for supporting the disc 5 is extended out. The disc 5 must be taken out in an inclined direction as shown in FIG. 13, the transport assemblies 2 are designed to be inclined. Hence, after clamping the disc 5, the push members 60 of the transport assemblies 2 are extended out in the inclined direction.

In addition, a segment of the clamping members 63 of the push members 60 of the present invention are continuously bending, so as to make the clamping members 63 elastic and to increase the clamping force when clamping the disc 5, thus clamping the disc 5 stably.

The disc holder 1 is disposed at an extrusion direction of the tray 6, and the transport assemblies 2 are disposed at both sides of the disk holder 1. An automatic disk feeding method for disk duplication system in accordance with the present invention comprises:

firstly, ejecting the disc 5 by the tray 6 after completion of copy to make the disc 5 locate between the transport assemblies 2;

secondly, synchronously moving the transport assemblies 2 to extend their clamping members 63 out of both sides of the disc 5, so as to clamp the disc 5;

thirdly, lifting the clamping members 63 which clamp the disc 5 to make the disc away from the tray 6;

fourthly, returning the tray 6 to the duplication device after the disc 5 is away from the tray 6 so as to make the lower part of the disc 5 has no support;

fifthly, lowering the clamping members 63 after the tray 6 is returned to the duplication device, such that the clamped disc 5 is released from the clamping members 63 and falls vertically, so as to make the disc 5 back to the extending position of the clamping members 63; and finally, withdrawing the clamping members 63.

With the above-mentioned structure, the present invention can achieve the following functions and effects:

Firstly, the linkage disk 20, the connecting rod 30, the positioning cover 40, the sliding block 50, the push members 60 and the slide rails 70 of each transport assembly 2 are small in size, produce a small motion and can cooperate with the duplication device with the smallest size and space.

Secondly, with the L-shaped tracks 71 defined in the slide rails 70 and with the cooperation of the sliding blocks 50, the clamping members 63 of the push members 60 can clamp the disc 5 by a horizontal extending method firstly, and then stably move the disc 5 by a vertical or inclined ascending method, and finally release and eject the disc 5 automatically. Hence, the present invention not only can stabilize the operation and eject the disc 5 quickly, but also satisfies the requirement of automatic disk ejection. Thirdly, the linkage disk 20, the connecting rod 30, the positioning cover 40, the sliding block 50, the push members 60 and the slide rails 70 of each transport assembly 2 all can be made by the plastic injection molding method, such that the purpose of mass production is achieved and the cost is reduced.

Fourthly, the ends of the clamping members 63 of the push members 60 are designed to be V-shaped for automatically guiding the disk 5 to the center, thus stably clamping the disc 5, and further improving the stability of disk clamping operation.

Fifthly, under the condition that the structure is not changed, the transport assemblies 2 can also clamp and release the disc 5 when being designed to be inclined, such an inclined design enables the disc 5 to eject out in the inclined direction, so as to avoid the duplication device and to prevent the disc 5 from unanticipatedly falling, thus releasing the disc 5 successfully.

While we have shown and described various embodiments in accordance with the present invention, it should be clear to those skilled in the art that further embodiments may be made without departing from the scope of the present invention.

What is claimed is:

1. An automatic disk feeding device for disk duplication system, comprising:

a disc holder, two transport assemblies, a linkage rod and a power source, wherein:

the transport assemblies are disposed at both sides of the disk holder;

the linkage rod is disposed between the transport assemblies for providing a synchronous movement of the transport assemblies;

the power source is used to provide an operation power to the transport assemblies;

each transport assembly comprises a linkage disk, a connecting rod, a positioning cover, a sliding block, two push members and two slide rails;

the linkage disk of each transport assembly is eccentrically provided with a first pivot portion and is connected to the linkage rod;

both ends of the connecting rod are provided with a first pivot portion and a second pivot portion, respectively, the first pivot portion of the connecting rod is combined with the first pivot portion of the linkage disk;

the positioning cover is defined with a guide hole and is disposed on the disk holder for restricting the sliding block, the push members and the slide rails of each transport assembly;

the sliding block of each transport assembly is provided with a second pivot portion at an outer surface thereof and is defined with at least one slant pushing groove at both sides thereof, the slant pushing groove is obliquely lowered from outside toward inside thereof, the sliding block is disposed in the positioning cover, the second pivot portion of the sliding block is inserted in the guide hole of the positioning cover and is pivotally disposed in the second pivot portion of the connecting rod;

an inner surface of each push member is provided with at least one pushing protrusion, an outer surface of each push member is provided with at least one guiding protrusion, one end of each push member is provided with a clamping member, the push members are located at both sides of the sliding block which is disposed in the positioning cover, the pushing protrusion of the push member is inserted in the pushing groove of the sliding block, the clamping members of the transport assemblies are extended into the disc holder;

the slide rails are disposed at the outer surfaces of the push members inside the positioning cover and are fixed to the positioning cover, an inner surface of each slide rail is defined with at least one L-shaped track having a horizontal section toward outside thereof, a vertical section is upwardly extended from an inner side of the horizontal section, the L-shaped tracks are provided for insertion of the guiding protrusions of the push members;

the linkage disk of the transport assembly drives the connecting rod to move, and then the connecting rod moves the sliding block and make it move in the guide hole of the positioning cover, the pushing protrusion of each push member moves in the pushing groove of the sliding block, the guiding protrusion of each push member moves in the horizontal section and the vertical section of each L-shaped track, when the guiding protrusion moves in the horizontal section, the clamping member performs a telescopic movement, when the guiding protrusion moves in the vertical section, the clamping member performs telescopic, and ascending and descending movements.

2. The automatic disk feeding device for disk duplication system as claimed in claim 1, wherein the clamping members of the push members are V-shaped and in the form of a notch.

3. The automatic disk feeding device for disk duplication system as claimed in claim 1, wherein a segment of the clamping members of the push members is continuously bending.

4. The automatic disk feeding device for disk duplication system as claimed in claim 1, wherein the clamping members of each transport assembly move up and down along a vertical direction of a tray of a duplication device.

5. The automatic disk feeding device for disk duplication system as claimed in claim 1, wherein the clamping members of each transport assembly move up and down along an inclined direction of a tray of a duplication device.

6. The automatic disk feeding device for disk duplication system as claimed in claim 1, wherein a plurality of positioning grooves is defined in both sides of an outer surface of the positioning cover, each slide rail is provided with a plurality of positioning pieces for restricting the positioning grooves of the positioning cover.

7. An automatic disk feeding method for disk duplication system, a disc holder being disposed at an extrusion direction of a tray, and two transport assemblies being disposed at both sides of the disk holder, the method comprising:

ejecting a disc by the tray after completion of copy to make the disc locate between the transport assemblies;

synchronously moving the transport assemblies to extend their clamping members out of both sides of the disc, so as to clamp the disc;

lifting clamping members which clamp the disc to make the disc away from the tray;

returning the tray to a duplication device after the disc is away from the tray so as to make a lower part of the disc has no support;

lowering the clamping members after the tray is returned to the duplication device, such that the clamped disc is released from the clamping members and falls vertically, so as to make the disc back to an extending position of the clamping members; and withdrawing the clamping members.

* * * * *